United States Patent [19]

Furutsu

[11] Patent Number: 4,998,048
[45] Date of Patent: Mar. 5, 1991

[54] DRIVING DEVICE FOR VIBRATION WAVE DRIVEN MOTOR

[75] Inventor: Etsuro Furutsu, Kawasaki, Japan

[73] Assignee: Canon Kabushiki Kaisha, Tokyo, Japan

[21] Appl. No.: 357,784

[22] Filed: May 30, 1989

[30] Foreign Application Priority Data

May 30, 1988 [JP] Japan .................. 63-132149

[51] Int. Cl.⁵ .......................................... H01L 41/08
[52] U.S. Cl. ..................... 318/116; 310/316
[58] Field of Search ................. 310/316, 317, 323; 318/116, 118

[56] References Cited

U.S. PATENT DOCUMENTS

| | | | |
|---|---|---|---|
| 4,713,571 | 12/1987 | Suzuki et al. | 310/316 |
| 4,727,267 | 2/1988 | Izukawa et al. | 310/323 X |
| 4,743,788 | 5/1988 | Takagi et al. | 310/316 |
| 4,748,365 | 5/1988 | Poupaert et al. | 310/316 |
| 4,794,294 | 12/1988 | Shimizu | 310/316 |
| 4,812,699 | 3/1989 | Ogawa et al. | 310/316 |
| 4,853,579 | 8/1989 | Kawasaki et al. | 310/316 |

FOREIGN PATENT DOCUMENTS

| | | | |
|---|---|---|---|
| 3406408 | 8/1984 | Fed. Rep. of Germany | 310/316 |
| 0002869 | 1/1987 | Japan | 310/323 |

Primary Examiner—Mark O. Budd
Attorney, Agent, or Firm—Fitzpatrick, Cella, Harper & Scinto

[57] ABSTRACT

There is disclosed a vibration wave driven motor, in which, when the motor is driven in a high frequency region distant from the resonance drive state, the variation of frequency is not prohibited in response to the detection of the drive state mentioned above, and the variation of frequency is prohibited in response to the detection of the drive state when the motor approaches to the resonance drive state.

10 Claims, 5 Drawing Sheets

DRIVING DEVICE FOR VIBRATION WAVE DRIVEN MOTOR

BACKGROUND OF THE INVENTION

Field of the Invention

The present invention relates to a driving circuit for a vibration wave driven motor.

Related Background Art

There is already known a vibration wave driven motor in which electromechanical energy converting elements such as piezoelectric or electrostrictive elements are arranged with mutual phase differences on a vibration member and are given signals of respectively different phases to generate a travelling vibration wave on the surface of the vibration member, thereby driving a rotor by means of said travelling vibration wave.

In the motor of the above-mentioned type, though the drive at the resonance state is most efficient and capable of achieving a high speed, the motor tends to stop abruptly if the driving frequency is even slightly deviated from the frequency giving rise to said resonant vibration. It is therefore necessary, in the drive control of the above-mentioned motor, to prevent the deviation of the driving frequency from the resonance frequency, thereby avoiding the abrupt stoppage of the motor explained above.

In order to prevent this problem, the present applicant already proposed to form a drive state signal corresponding to the drive state by monitoring the vibration state of the motor, to discriminate whether the motor is driven at the resonance frequency or in the vicinity thereof based on said signal, and, if such drive state is reached, to prohibit the transition of the drive frequency to a value beyond said drive frequency (namely a frequency lower than the resonance frequency).

However, in such vibration wave driven motor, said drive state signal may be almost the same as in the resonance state or in the vicinity thereof even when said motor is driven in a high frequency range other than said resonance frequency or the vicinity thereof. Therefore the drive state in said high frequency range may be mistaken as the resonance state or the vicinity thereof, and the transition to a drive frequency of better characteristics may become prohibited.

SUMMARY OF THE INVENTION

An object of the present invention is to provide a vibration wave driven motor not associated with the above-mentioned drawbacks.

Another object of the present invention is to provide a vibration wave driven motor capable of reaching the resonance state within a short time.

The above-mentioned objects can be attained, according to the present invention, by not prohibiting the transition of the frequency in response to said drive state signal when the vibration wave driven motor is driven in a frequency range, for example high frequency range, distant from the resonance state, and by effecting said prohibition of frequency transition in response to the drive state signal when the motor approaches to the resonance drive state.

The other object will be apparent in the description in connection with the preferred embodiments of the present invention.

DETAILED DESCRIPTION OF THE PREFERRED EMBODIMENTS

Figure 1:
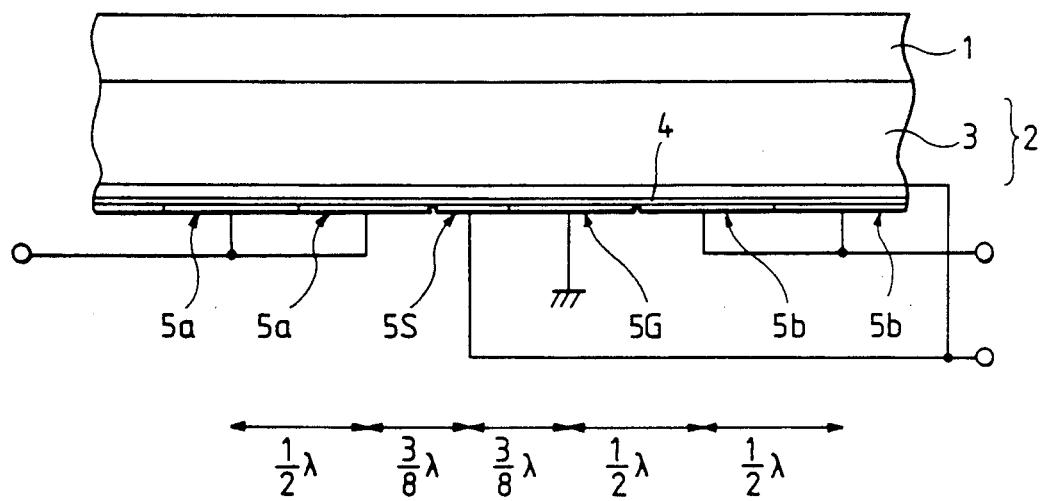
FIG. 1 is a cross-sectional view of a vibration wave driven motor to be driven by the driving circuit of the present invention.

FIG. 1 is a cross-sectional view of a vibration wave driven motor of the present invention, seen from the radial direction, wherein shown are a rotor 1; a vibration member 3; a piezoelectric element adhered on the vibration member 3 and subjected to polarization; and a group of electrodes 5 (including electrodes 5a, 5b, 5G and 5S). The vibration member 3 and the piezoelectric member 4 constitute a stator 2, and the rotor 1 is in friction contact with the vibration member 3.

Among said electrodes 5, driving electrodes a are provided on the piezoelectric element 4 with a pitch of $\lambda/2$, wherein $\lambda$ is the wavelength of the bending travelling wave in the vibration member 3. Other driving electrodes 5b are also formed with the pitch of $\lambda/2$. A vibration detecting electrodes 5S is distanced by $3\lambda/8$ from the driving electrode 5a. 5G is a ground electrode. The piezoelectric elements having the electrodes 5a constitute phase A, and those having the electrodes 5b constitute phase B. The pole separation of the piezoelectric element and the electrode arrangement are already known and will not, therefore, be explained further.

In the above-explained structure, AC voltages with a mutual phase difference of 90° are respectively supplied to the electrodes 5a and 5b to generate a travelling vibration wave on the vibration member 3, thereby driving the rotor 1. When the drive signal to the electrodes 5a is at the resonance frequency fr, the signal obtained from the electrode 5S is different in phase by −45° with respect to said drive signal. If the drive signal is deviated from said resonance frequency fr, the phase difference between the electrodes 5a and 5S is also deviated from −45°. Consequently the detection of said phase difference allows to detect the deviation of the driving frequency from the resonance frequency fr.

The phase difference between the signals of the electrodes 5a and 5S at the resonance drive state varies from −45° mentioned above, according to the deviation in the positional phase of the electrodes 5S and 5a, but, even in such case, said phase difference between the signals of the electrodes 5a and 5S assumes a particular value which is not −%b 45° in the resonance drive state. Consequently, also in such case, the detection of the deviation from said particular value of phase difference between the signals of the electrodes 5a and 5S allows to detect the deviation of the driving frequency from the resonance frequency fr.

Figure 2:
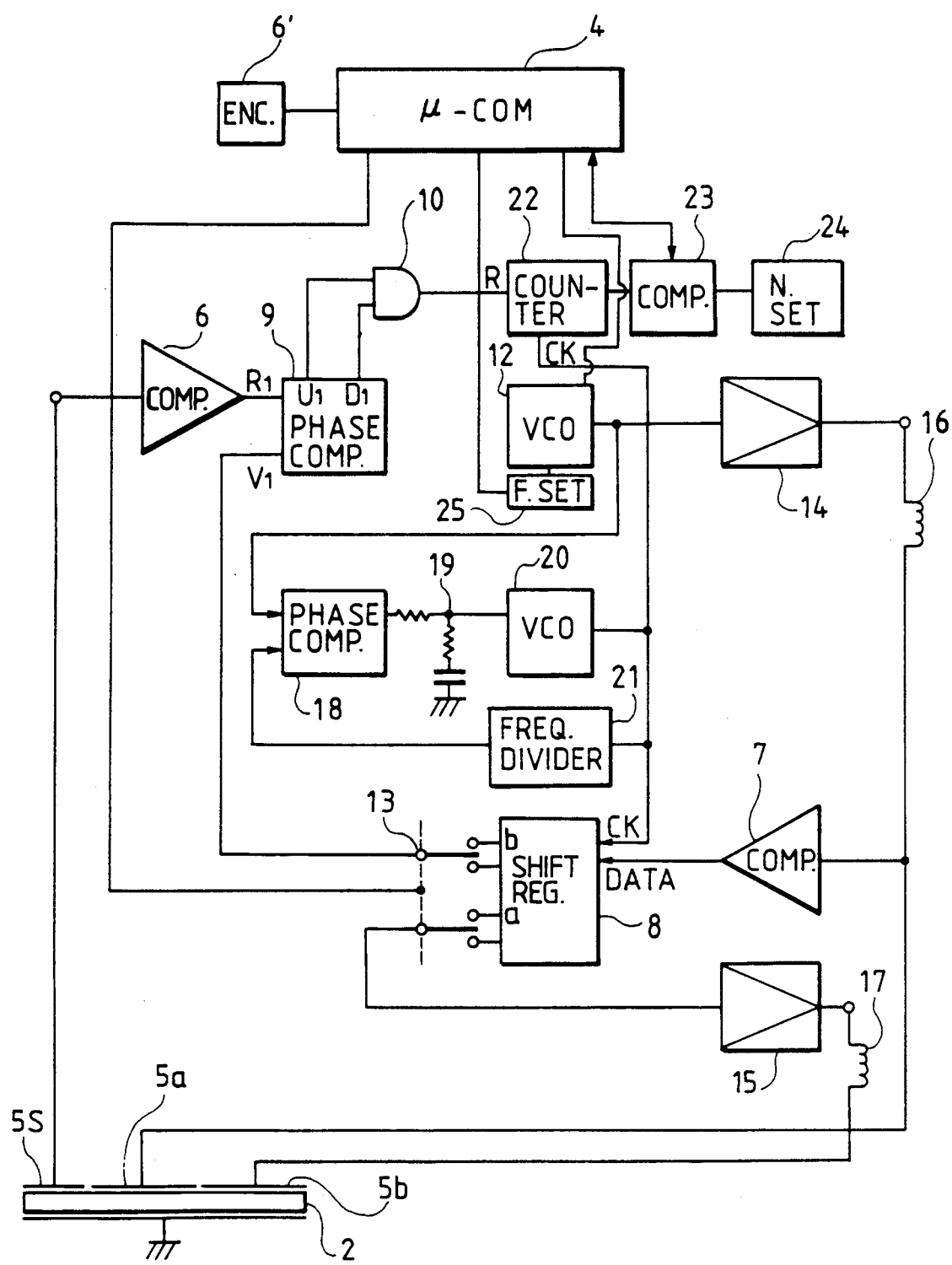
FIG. 2 is a circuit diagram showing an embodiment of the vibration wave driven motor of the present invention.

FIG. 2 is a circuit diagram of an embodiment of the drive circuit for the vibration wave driven motor of the present invention.

In FIG. 2 there are shown the stator 2 of the vibration wave driven motor shown in FIG. 1, a voltage-controlled oscillator 12 for generating a frequency corresponding to the input voltage; an amplifier 14; a matching coil 16 for applying, the in cooperation with said amplifier, the AC signal from said oscillator 12 to the electrodes 5a; a comparator 7 for shaping the signal transmitted by the coil 16 connected to the output of the amplifier 14 (i.e. the voltage signal applied to the stator of the vibration wave driven motor) into a pulse signal; and a shift register 8 for shifting the pulse from the comparator 7 by 90°, for supply to the electrodes 5b through a rotating direction switch 13, an amplifier 15 and a coil 17. In the above-explained structure, the electrodes 5a and 5b respectively receive AC voltages with a mutual phase difference of 90°. An edge-triggered phase comparator 18 receives the output of said oscillator 12 and the output of a frequency divider (1/32) 21. A voltage-controlled oscillator 20 generates a frequency corresponding to the output of said comparator 18, supplied through a lag lead filter 19. When the phase difference between the input signals is zero, said comparator 18 becomes open to maintain the output of the oscillator 20. In the presence of a phase difference, it generates a signal of variable duty ratio according to the direction and amount of said phase difference, thus increasing or decreasing the output frequency of the voltage-controlled oscillator 20. Consequently the operation is so controlled that the two input signals of the comparator 18 assume a same phase, so that the output of the frequency divider 21 assumes the same phase and same frequency as those of the output of the oscillator 12. Thus the output frequency of the oscillator 20 is N times (32 times) of that of the oscillator 12. As the output signal of said N-times frequency is used as the clock signal for the shift register 8, the output from a N/4-th stage(32/4-th stage) thereof is displaced by 90° in phase from the output of the comparator 7, or that of the oscillator 12. In this manner a phase difference of 90° is generated between the electrodes 5b and the electrodes 5a.

Figure 3A:
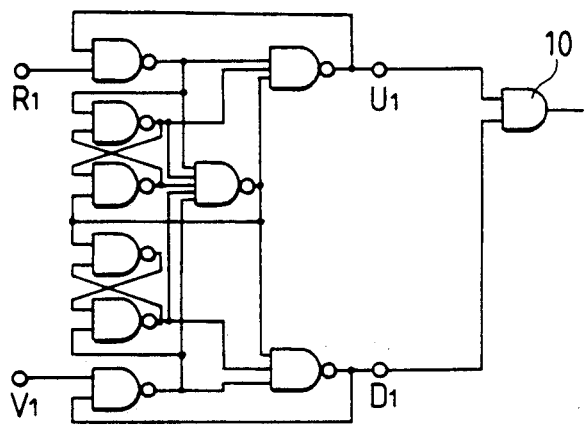
FIG. 3A is a circuit diagram of a comparator shown in FIG. 2.
Figure 3B:
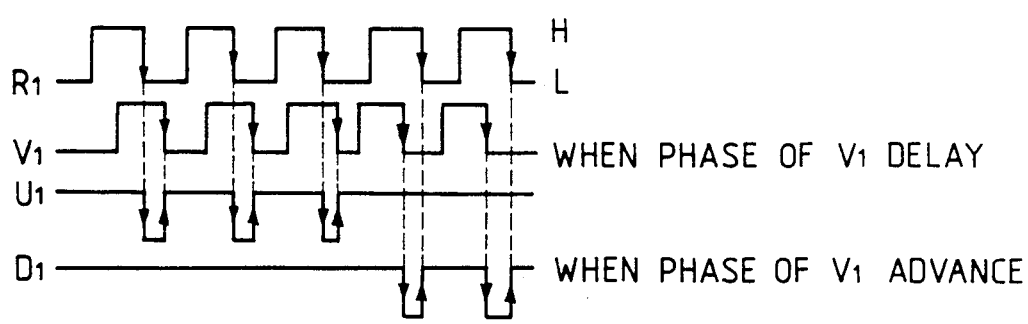
FIG. 3B is a wave form chart showing the function of the circuit shown in FIG. 3A.

There are further provided a comparator 6 for shaping the signal from the electrodes 5S into a pulse signal, and an edge-triggered phase comparator 9 constructed as shown in FIG. 3A. Said comparator detects the phases of the input pulses to input terminals $R_1$, $V_1$, and shifts the output signal $U_1$ or $D_1$ to the low level for a period corresponding to the phase difference, as shown in FIG. 3B, respectively when the phase of the input signal $R_1$ is advanced or delayed with respect to that of the input signal $V_1$, but maintain the output signals $U_1$, $D_1$ at the high level of the phases of both input signals mutually coincide.

There are further provided an AND gate 10 receiving the outputs $U_1$, $D_1$ of said comparator 9; a counter 22 of which reset terminal is connected to the output of said AND gate 10, for counting the clock pulses from said oscillator 20 when the reset state is cancelled by the high-level output of the AND gate 10; a number setting device 24; and a comparator 23 for comparing the count of the counter 22 with a preset number and releasing a high-level output signal when the latter is larger.

Also provided are frequency setter 25 for setting the spontaneous frequency of the oscillator 12, and a microcomputer 4 for controlling the system shown in FIG. 2. The input $V_1$ of the comparator 9 is connected to the output b of the N/8-th (32/8-th) stage of the register 8. A pulse interval measuring device 6' measures the interval T of pulses from a pulse generating circuit, such as an encoder, which detects the rotation of the rotor of the motor and correspondingly generates pulses of a shorter interval for a faster rotation.

Figure 4:
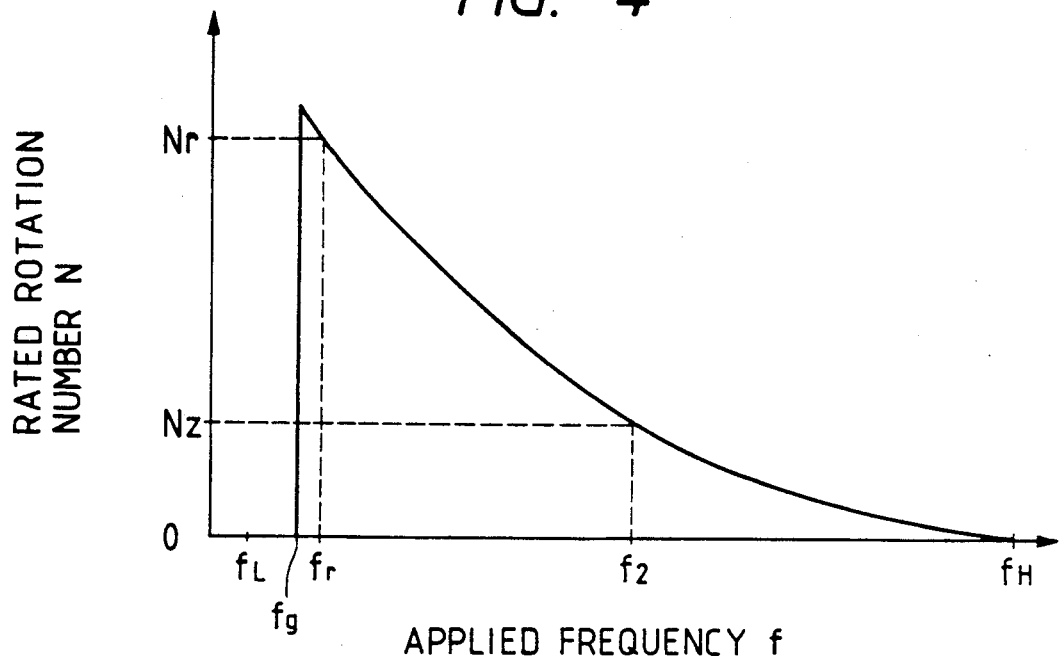
FIGS. 4 and 5 are charts showing the characteristics of the vibration wave driven motor.

FIG. 4 shows the rated revolution N as a function of the frequency f of the AC drive signals supplied to the piezoelectric elements of the phases A, B of the motor, wherein fr indicates a mechanical resonance frequency, and fg indicates a frequency where the revolution drops abruptly.

Figure 5:
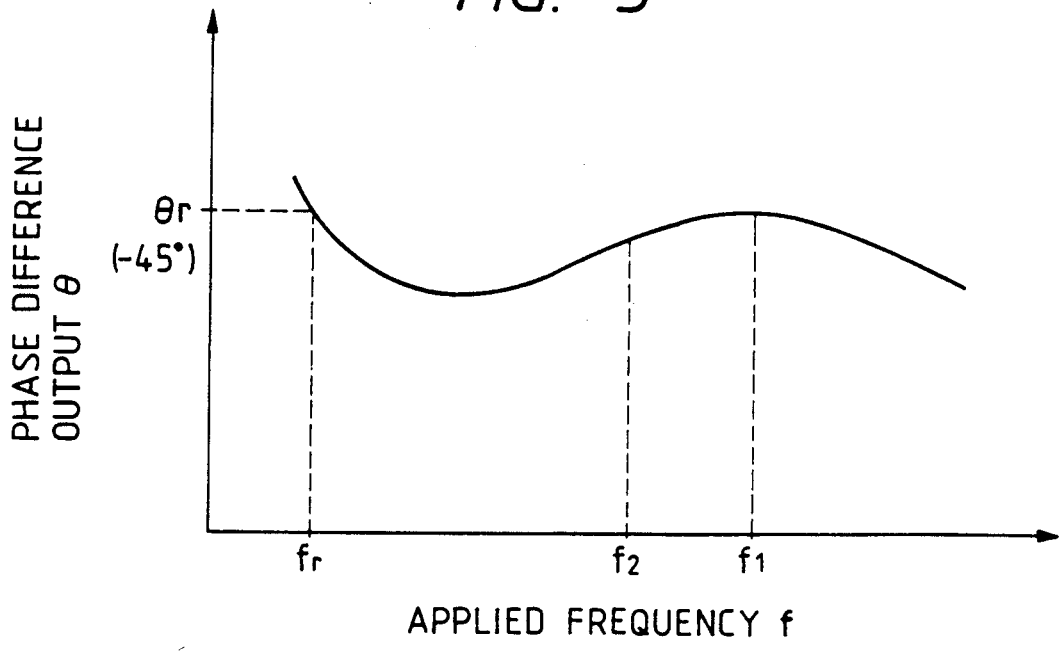

FIG. 5 indicates the phase difference between the signal supplied to the piezoelectric elements of the phase A and the signal from the electrode 5S, as a function of the frequency f of the AC drive signals supplied to the piezoelectric elements of the phases A, B of the motor, wherein fr indicates the mechanical resonance frequency, corresponding to a phase difference $\theta r$, which is $-45°$ or $135°$ respectively in the forward or reverse rotation, in the structure of the present embodiment. Since the phase difference $\theta r$ is not linear to the applied frequency, said phase difference assumes a value close or $\theta r$ in the vicinity of a frequency $f_1$.

In the following the function of the embodiment shown in FIG. 2 will be explained, with reference to a flow chart shown in FIG. 6. A corresponding control program is stored in the microcomputer 4.

When an unrepresented power switch is turned on, the execution of said program is started, and a step 1 initializes an internal memory of the microcomputer 4 and sets, in the setter 25, the drive frequency $f_O$ at the maximum frequency $f_H$. Then a step 2 discriminates the state of an unrepresented operating member, and the sequence proceeds to a step 3 or 4 respectively if a stop state or a drive state is selected.

In the former case, the step 3 deactivates the oscillator 12 to terminate the drive control, and the sequence returns to the step 2. Thus the steps 2 and 3 are repeated unless the drive state is selected by said operating member. The step 3 also sets the drive frequency $f_O$ at $f_H$ again.

The function in case the sequence proceeds to the step 4, in response to the actuation of the operating member, is as follows.

The step 4 sets the switch 13, by discriminating whether forward or reverse rotation is instructed to the microcomputer 4 by an unrepresented operating member. If the forward rotation mode has been selected, the switch 13 selects the terminals a, b of the register 8. On the other hand, since the drive state has been identified in the step 2, the oscillator 2 oscillates with a frequency $f_O = f_H$ set by the setter 25, thus supplying the electrodes 5a with a signal of said frequency $f_O = f_H$. Also the electrodes 5b are given the signal from the output a of the register 8, namely the signal of a frequency $f_O = f_H$ with a phase difference of 90° with respect to the signal supplied to the electrodes 5a, whereby the motor is in the drive state.

A step 5 discriminates the instruction for acceleration, deceleration or speed retaining, given to the microcomputer 4 from an unrepresented operating member, and the sequence respectively proceeds to a step 6, 10 or 12. Let us consider a case in which the sequence proceeds to the step 6 in response to an instruction for acceleration.

The step 6 compares the drive frequency $f_O$ with the minimum settable frequency $f_L$, and the sequence proceeds to a step 7 if $f_O > f_L$. If $f_O \leq f_L$ the sequence proceeds to a step 12 since the driving of the motor is not possible at a lower frequency.

The step 7 compares the pulse interval T detected by the pulse interval measuring device 6' with the preset value $T_2$, and, if $T \leq T_2$, or if the motor is driven at a low speed, the sequence proceeds to a step 9 without the detection of the phase difference in a step 8. The step 9 reduces the drive frequency $f_O$ by a predetermined amount $-f\Delta$, and the step 12 sets thus reduced frequency as a new drive frequency in the setter 25, whereby the drive frequency is reduced. As the result the motor is accelerated. The above-explained operation is repeated while the condition $T \geq T_2$ continues, and the motor gradually assumes the high-speed drive state. On the other hand if the step 7 identifies $T < T_2$ in the course of the above-mentioned operation, the sequence proceeds to the step 8.

The step 8 discriminates the output of the comparator 23, and, if it is in the low level, the sequence proceeds to the step 12.

As already explained before, the comparator 23 releases a high-level signal when the count of the counter 22 is smaller than the preset value, and the counter 22 is released from the reset state and effects the counting operation when the AND gate 10 releases a high-level output signal. Consequently the count becomes lower as the duration of the low-level signal from the gate 10 is longer. On the other hand, as will be apparent from FIG. 3B, the duration of low-level output from the gate 10 becomes longer as the phase difference between the input signals $R_1$, $V_1$ to the comparator 9 becomes larger. Thus, when the phase difference of the input signals to the comparator 9 is large, said count becomes smaller than the preset value, whereby the comparator 23 releases a high-level output signal and the sequence proceeds to the step 9. The input signals $R_1$, $V_1$ to the comparator 9 are respectively obtained from the electrode 5S and the output b of the register 8, namely from the N(32)/8-th stage of the register 8, which is displaced by 45° with respect to the signal to the electrodes 5a. Consequently, as the phase difference $\theta r$ shown in FIG. 5 approaches to $-45°$, the duration of low-level state in the output signal $V_1$ or $D_1$ from the comparator 9 becomes shorter, so that the duration of the high-level output from the gate 10 becomes longer. Thus the count of the counter 22 increases as the operation approaches to the resonance state.

Based on the foregoing, if the step 8 identifies that the drive state is close to the resonance state, the sequence proceeds to the step 12 to drive the motor without decrease in the frequency. On the other hand, if the drive state is distant from the resonance state, the sequence proceeds to the step 9 to reduce the frequency and to drive the motor with thus reduced frequency. If this set value is selected, in relation to the count of the counter 22, slightly different from the resonance state, it is possible to prevent stoppage of the motor in the course of acceleration, caused by the transition of the drive frequency to a lower value fg (FIG. 4) beyond the resonance frequency fr in the step 9.

Thus, in the acceleration, the drive frequency is gradually lowered in the step 9 to accomplish the acceleration, and, once the frequency reaches a value equal to or close the resonance frequency, the motor continues to be driven with thus reached frequency.

Also when the revolution is slow, the sequence proceeds from the step 7 to the step 9 for reducing the frequency without the process in the step 8. Therefore, if the present value $T_2$ is selected corresponding for example to the revolution $N_2$ shown in FIG. 4, it is possible to disregard the phase difference $\theta r$ even when it is identified in the step 8 close to the value of resonance state in a frequency region higher than the frequency $f_2$. Thus, in the use of a system in which prevents the reduction of the drive frequency beyond the resonance frequency based on the discrimination of the phase difference in the step 8, the driving of the motor is not hindered unreasonably even when the phase difference $\theta r$ assumes a value close to the resonance state in the course of drive in the high frequency region.

In the following there will be explained the process of deceleration.

In response to an instruction for deceleration, the sequence proceeds to a step 10 which compares the drive frequency $f_O$ with the maximum frequency $f_H$, and, if $f_O \doteq f_H$, the sequence proceeds to the step 12. In this manner, in the deceleration, the drive frequency is brought to the maximum frequency, and the motor is thereafter driven with said maximum frequency as the frequency cannot be made higher.

On the other hand, in case of $f_O < f_H$ so that the drive frequency can still be made higher, the sequence proceeds to a step 11 for increasing the drive frequency by a predetermined amount $+f\Delta$, then the step 12 sets thus increased frequency as a new drive frequency, and these steps are repeated. Consequently the drive frequency increases gradually, whereby the motor is decelerated.

Figure 7:
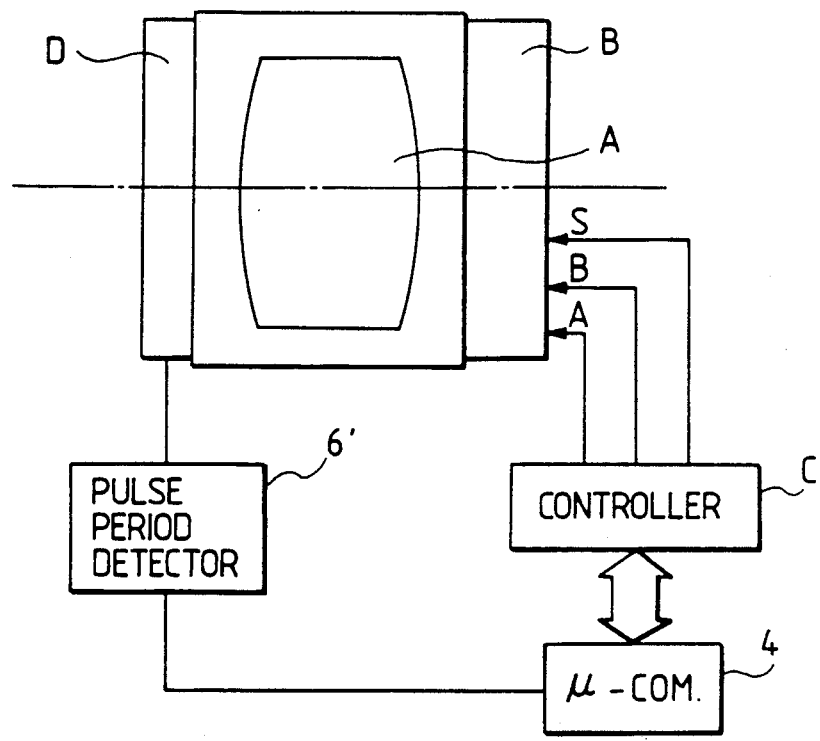
FIG. 7 is a block diagram showing an application of the drive circuit of the present invention to a lens drive unit.

FIG. 7 is a block diagram showing an application of the above-explained motor control device in a lens drive control device.

Figure 6:
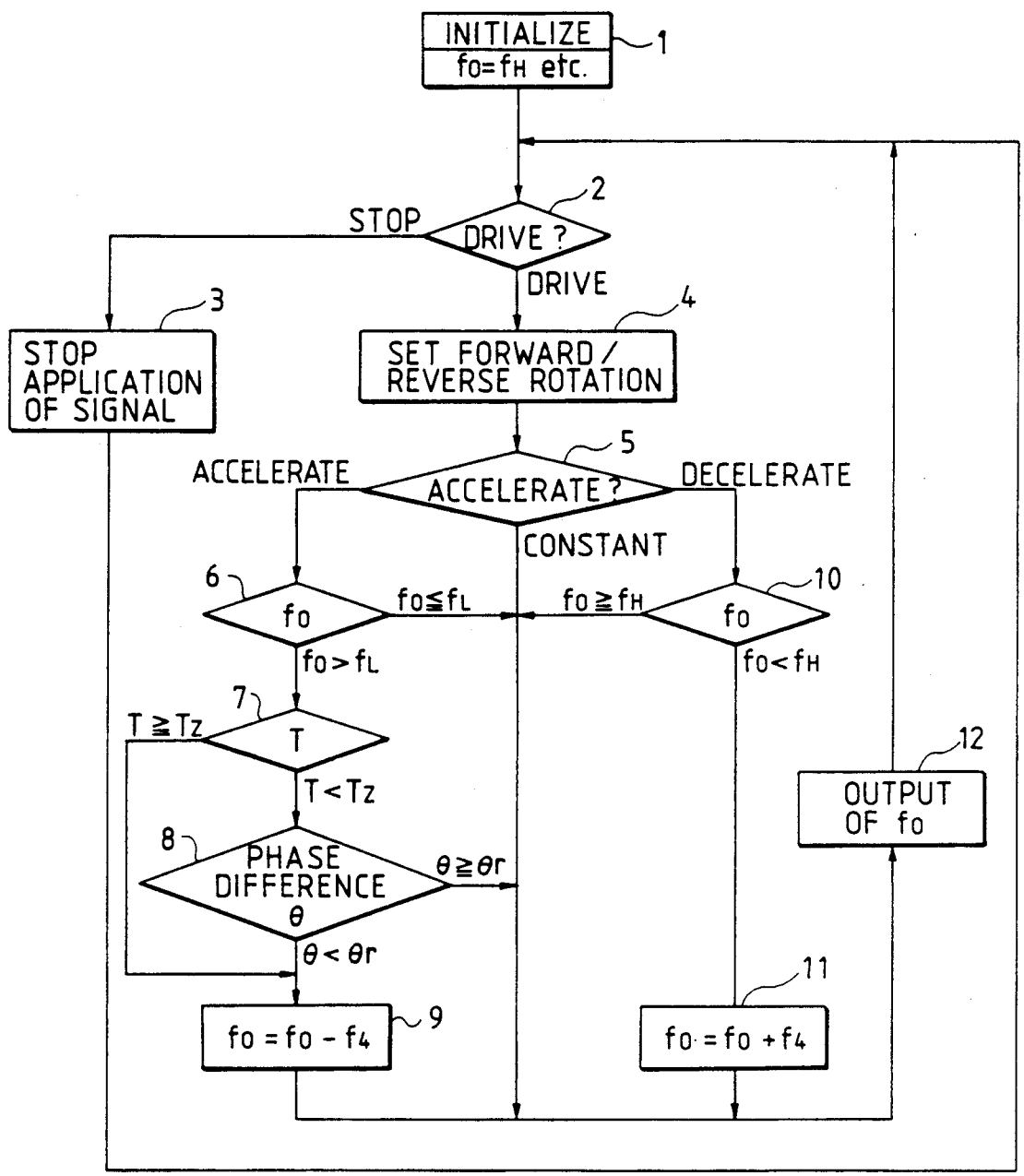
FIG. 6 is a flow chart showing the control sequence of the circuit shown in FIG. 2.

In FIG. 6 there are shown a lens system A; a motor B shown in FIG. 1, in which the rotation of the rotor serves to drive the lens system in the axial direction; a control circuit C as shown in FIG. 2 but excluding the microcomputer 4; a microcomputer 4 shown in FIG. 2; a pulse interval measuring device 6' shown in FIG. 2; and a pulse generating circuit D in which light is projected onto a black-and-white pattern formed on a plate rotating in relation to the driving of the lens system A and the light reflected from said pattern is received by a photosensor to generate pulses of an interval corresponding to the drive speed of said lens system A.

In the above-explained structure, the motor B is controlled by the control circuit C as already explained in relation to the embodiment shown in FIG. 2, whereby the lens system is axially driven with speed control.

Figure 8:
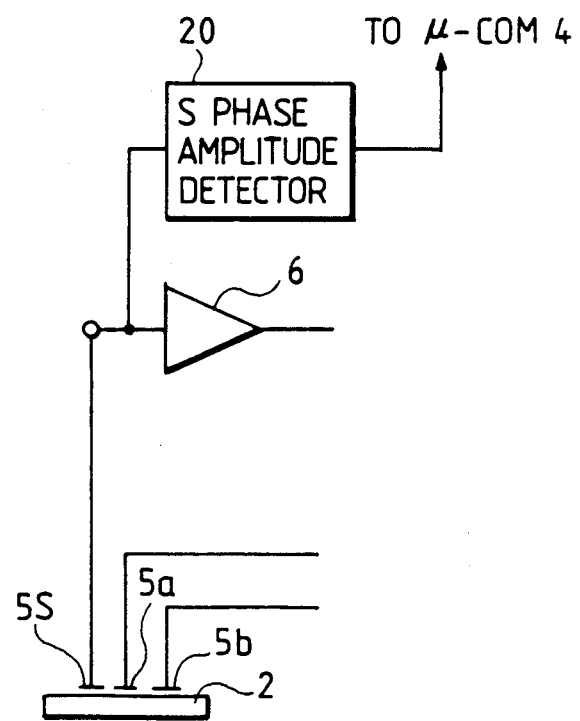
FIG. 8 is a circuit diagram showing another embodiment for detecting the high frequency drive state of the motor shown in FIG. 2.

FIG. 8 is a circuit diagram of an embodiment for discriminating, from the output of the electrode 5S, whether the motor is driven with a high frequency distant from the resonance frequency. In FIG. 8, same components as those in FIG. 2 are represented by same symbols. In the embodiment shown in FIG. 8, there is provided a comparator 20 for comparing the output level from the electrode 5S with a predetermined value, and sending a high-level signal to the computer 4 when the former is larger. In this circuit structure, the signal from the pulse interval measuring device 6', shown in FIG. 2, need not, naturally, be supplied to the microcomputer 4.

The output signal from the electrodes 5S assumes the highest level when the motor is in the resonance state, but assumes a low level when the motor is driven in a high frequency region distant from the resonance state.

Thus the effects and advantages as in the embodiment shown in FIG. 2 can be obtained if the sequence is made to proceed to the step 8 or 9 respectively if the step 7 identifies the high or low level output from the comparator 20.

Also as an alternative for the identification of the pulse interval in the step 7 shown in FIG. 6, it is possible to discriminate whether the current drive frequency $f_O$ is higher than a predetermined high frequency (for example $f_2$ in FIG. 4) distant from the resonance frequency, and to advance the sequence to the step 8 or 9 respectively if $f_O \geq f_2$ or $f < f_2$. In the foregoing embodiment piezoelectric elements are employed as the vibration source of the motor, but there may be employed other electromechanical energy converting elements capable of causing vibration in response to AC electrical signals, such as electrostrictive elements.

As explained in the foregoing, the prohibition of transition of the drive frequency in response to the detection of phase difference is cancelled when the motor is driven in a high frequency region distant from the resonance state, so that the motor can be rapidly driven to the resonance state even if the phase difference detected in said high frequency region is similar to that in the resonance state.

In the foregoing embodiments the moving member is driven by the travelling vibration wave generated in the vibration member, but it is also possible to move the vibration member. In such case said moving member in the foregoing embodiment has to be fixed.

What is claimed is:

1. A driving device for a vibration wave driven motor in which a relative movement is generated between a vibration member and a friction member by a travelling vibration wave generated in said vibration member, comprising:
   (a) drive state detection means for detecting the drive state of said motor and generating an output in the event that said motor is in a resonance drive state or in a state close thereto;
   (b) varying means for varying the frequency of periodical signals to be supplied to electromechanical converting elements provided on said vibration member, from a first frequency to a second frequency;
   (c) prohibiting means for prohibiting said varying means from varying the frequency toward said second frequency in response to the output from said drive state detecting means, wherein said prohibiting means prohibits the frequency of said periodical signal from varying toward said second frequency beyond a frequency corresponding to the resonance state of said motor;
   (d) discrimination means for discriminating whether the frequency of the periodical signal varied by said varying means is in a frequency region distant from the frequency corresponding to the resonance state of the motor; and
   (e) control means for disabling said prohibiting means in the event that said discrimination means discriminates that said frequency is in said distant frequency region.

2. A driving device according to claim 1, wherein said drive state detecting means compares a phase of an amplitude of the vibration wave generated by said vibration member with a phase of a signal corresponding to said periodic signal and produces said output in the event that the difference between said two phases becomes a predetermined value.

3. A driving device according to claim 1, wherein said varying means varies the frequency of said periodical signals from high frequency to low frequency.

4. A driving device according to claim 1, wherein said discrimination means discriminates the frequency region on the basis of a rotation speed of the motor and the frequency of said periodic signals.

5. In a driving device for a vibration wave driven motor provided with a vibration member, a friction member in friction engagement with said vibration member, plural electromechanical energy converting elements provided in different positions on said vibration member, and means for supplying some of said converting elements with a first periodical signal and supplying the remainder of said converting elements with a second periodical signal different in electrical phase from the first periodical signal, whereby a relative movement is generated between said vibration member and said friction member by a travelling vibration wave generated in said vibration member when said first and second periodical signals are applied to said converting elements, and improvement comprising:
   (a) drive state detection means for detecting the drive state of said motor and generating an output in the event that said motor is in a resonance drive state or in a state close thereto;
   (b) varying means for varying the frequency of the first and second periodical signals supplied to the electromechanical energy converting element provided on said vibration member from a first frequency to a second frequency;
   (c) prohibiting means for prohibiting said varying means from varying the frequency toward said second frequency in response to the output from said drive state detecting means, wherein said prohibiting means prohibits the frequency of said periodical signal from varying toward said second frequency beyond a frequency corresponding to the resonance state of said motor;
   (d) discrimination means for discriminating whether the frequency of the periodical signal varied by said varying means is in a frequency region distant from the frequency corresponding to the resonance sate of the motor; and
   (e) control means for disabling said prohibiting means in the event that said discrimination means discriminates that said frequency is in said distant frequency region.

6. A driving device according to claim 5, wherein said drive state detecting means includes a sensor fixed to said vibration member for detecting the amplitude of the vibration wave generated by said vibration member.

7. A driving device for a vibration wave driven motor in which a relative movement is generated between a vibration member and a friction member by a travelling vibration wave generated in said vibration member, comprising:
   (a) drive state detection means for detecting the drive state of said motor and generating an output in the event that said motor is in a resonance drive state or in a state close thereto;

(b) varying means for varying the frequency of periodical signals to be supplied to electromechanical energy converting elements provided on said vibration member, from a first frequency to a second frequency;

(c) prohibiting means for prohibiting said varying means from varying the frequency toward said second frequency in response to the output from said drive state detecting means, wherein said prohibiting means prohibits the frequency of said periodical signal from varying toward said second frequency beyond a frequency corresponding to the resonance state of said motor;

(d) discrimination means for detecting the rotating speed of said motor and generating an output in the event that said rotating speed is lower than a predetermined speed; and (e) control means for disabling said prohibiting means in response to the output of said discriminating means.

8. A driving device for a vibration wave driven motor in which a relative movement is generated between a vibration member and a friction member by a travelling vibration wave generated in said vibration member, comprising:

(a) drive state detection means for detecting the drive state of said motor and generating an output in the event that said motor is in a resonance drive state or in a state close thereto;

(b) varying means for varying the frequency of periodical signals to be supplied to electrochemical energy converting elements provided on said vibration member, from a first frequency to a second frequency;

(c) prohibiting means for prohibiting said varying means from varying the frequency toward said second frequency in response to the output from said drive state detecting means, wherein said prohibiting means prohibits the frequency of said periodical signal from varying toward said second frequency beyond a frequency corresponding to the resonance state of said motor;

(d) monitor means for generating an output corresponding to the drive state of said motor; and (e) control means for disabling said prohibiting means in the event that the output of said monitor means is within a predetermined range.

9. A vibration driven motor, comprising:

(a) a vibration member having an electromechanical energy converting element, said vibration member generating a vibration in response to a periodical signal to be supplied to the converting element;

(b) a first detecting means for detecting a rotation speed of the motor and for generating a first control signal in the event that the rotation speed is lower than a predetermined level;

(c) a second detecting means for detecting the drive state of the motor and for generating a second control signal in the event that the motor is in a resonance drive state or in a state close thereto; and (d) a frequency control means for dropping the frequency of said periodical signal in response to the first control signal and for maintaining the frequency of said periodical signal in response to the second control signal.

10. A vibration driven motor, comprising:

(a) a movable member;

(b) a vibration member having an electromechanical energy converting element, said vibration member generating a vibration in response to a periodical signal to be supplied to the converting element, whereby a relative movement is generated between the vibration member and the movable members by the vibration generated in said vibration member;

(c) a first detecting means for detecting a rotation speed of the motor and for generating a first control signal in the event that the rotation speed is lower than a predetermined level;

(d) a second detecting means for detecting the driving state of the motor and for generating a second control signal in the event that the driving state of the motor is in a resonance state or in a state close thereto; and (e) a frequency control means for dropping the frequency of said periodical signal in response to said first control signal and for maintaining the frequency of said periodical signal in response to said second control signal.

* * * * *

UNITED STATES PATENT AND TRADEMARK OFFICE
CERTIFICATE OF CORRECTION

PATENT NO. : 4,998,048

DATED : March 5, 1991

INVENTOR(S) : ETSURO FURUTSU

It is certified that error appears in the above-identified patent and that said Letters Patent is hereby corrected as shown below:

Title Page:
<u>AT [57] ABSTRACT</u>

<u>COLUMN 2</u>

Line 29, "piezoelectric element" should read --piezoelectric element 4--.

Line 35, "driving electrodes a" should read --driving electrodes 5a--.

Line 40, "electrodes 5S" should read --electrode 5S--.

Line 67, "-%b 45°" should read -- -45°--.

<u>COLUMN 3</u>

Line 12, "the" should be deleted.

<u>COLUMN 4</u>

Line 19, "phase difference" should read --phase difference θ--.

Line 58, "oscillator 2" should read --oscillator 12--.

<u>COLUMN 5</u>

Line 12, "$T \leq T_2$," should read --$T \geq T_2$,--.

UNITED STATES PATENT AND TRADEMARK OFFICE
CERTIFICATE OF CORRECTION

PATENT NO. : 4,998,048
DATED : March 5, 1991
INVENTOR(S) : ETSURO FURUTSU

It is certified that error appears in the above-identified patent and that said Letters Patent is hereby corrected as shown below:

AT [57] ABSTRACT

COLUMN 6

Line 26, "$f_o \div f_H,$" should read --$f_o \geq f_H,$--.

COLUMN 9

Line 31, "electrochemical" should read --electromechanical--.

Signed and Sealed this

Eighth Day of December, 1992

Attest:

DOUGLAS B. COMER

Attesting Officer

Acting Commissioner of Patents and Trademarks